United States Patent [19]

Soleau

[11] Patent Number: 4,746,297

[45] Date of Patent: May 24, 1988

[54] ROTATIVE ELECTRICAL CONNECTOR

[76] Inventor: James R. Soleau, P.O. Box 33222, Seattle, Wash. 98133

[21] Appl. No.: 934,306

[22] Filed: Nov. 24, 1986

Related U.S. Application Data

[63] Continuation-in-part of Ser. No. 719,074, Apr. 2, 1985, Pat. No. 4,624,141.

[51] Int. Cl.⁴ .............................................. H01R 39/02
[52] U.S. Cl. ........................................ 439/8; 439/178
[58] Field of Search ............. 339/7, 8 R, 8 L, 118 R, 339/118 RY; 439/5, 6, 8, 10, 13, 178

[56] References Cited

U.S. PATENT DOCUMENTS

| | | | |
|---|---|---|---|
| 1,953,864 | 4/1934 | Morris | 339/7 |
| 3,411,128 | 11/1968 | Weinstein | 339/118 R X |
| 3,459,873 | 8/1969 | Harris et al. | 339/7 X |

Primary Examiner—Eugene F. Desmond
Attorney, Agent, or Firm—Christensen, O'Connor, Johnson & Kindness

[57] ABSTRACT

A rotative electrical connector is provided that allows connection of wires to a movable member so that the member can be moved without disturbing the electrical connection or fatiguing the electrical wire. The connector includes a spherical conductive member attached to the electrical wire and a spherical shell encasing the spherical member, which, in turn, is connected to a second electrical lead. Preferably, a conductive lubricant, such as a conductive grease is inserted into the space between the outer surface of the spherical member and the interior surface of the spherical shell so that there is an electrical connection between the spherical member and the shell. More than one electrical lead can be accommodated by using additional spherical members attached to the additional electrical leads, each of them encompassed in a separate conductive shell, the spherical members and spherical shells being insulated from one another but mechanically connected to one another.

10 Claims, 2 Drawing Sheets

ROTATIVE ELECTRICAL CONNECTOR

This application is a continuation-in-part of my copending U.S. patent application Ser. No. 719,074, filed Apr. 2, 1985, now U.S. Pat. No. 4,624,141, issued Nov. 25, 1986.

BACKGROUND OF THE INVENTION

This invention relates to electrical connectors and, more particularly, relates to a spherical rotatable connector that permits movement of the member to which electrical connection is made.

In many situations, it is desirable to connect an electrical lead to a movable member. In some environments, the movement of the movable member is limited to such a degree that it is possible to make a rigid connection and allow the movement of the connected member to be accommodated in flexing of the electrical lead. However, there are many environments in which the movement of the connected member is too frequent or is too expensive to allow the lead to flex, since this would cause immediate or eventual breakage of the lead due to the mechanical fatigue. It is known to provide slip rings or annular commutators to allow rotative movement of the connected member without stressing the lead. In many instances, it is desirable to permit a wider range of motion than is allowed by such annular commutators.

It is, therefore, an object of the present invention to provide an electrical connector that permits almost universal movement of the connected member without flexing the electrical lead. It is a further object of this invention to provide a connector that is substantially spherical.

SUMMARY

In accordance with the above-stated objects, a rotative electrical connector is provided for electrically coupling a first wire to a movable member or for electrically coupling first and second wires through a movable member. The connector includes a conductive sphere journalled within a substantially spherical shell. The inner surface of the shell is conductive and electrically coupled to the conductive sphere. The first wire is mechanically and electrically connected to the conductive sphere and the second wire is coupled electrically and mechanically to the shell. The first and second wires are thereby coupled electrically to one another through the spherical shell and the conductive sphere regardless of the rotational movement of the sphere within the shell.

Preferably, a conductive grease or other conductive lubricant is placed within the shell to lubricate the bearing surfaces of the sphere and shell and also to conduct electricity between the outer surface of the sphere and the inner surface of the shell. In the case of multiple wire pairs that must be connected together, additional sphere and shell pairs can be connected to one another by insulating conduit members and the wires to be coupled can pass through the conduit members and bores in the spheres until they reach their associated sphere for connection.

BRIEF DESCRIPTION OF THE DRAWINGS

The operation and advantages of the present invention will be better understood by those of ordinary skill in the art and others upon reading the ensuing specification when taken in conjunction with the appended drawings wherein.

DETAILED DESCRIPTION OF THE PREFERRED EMBODIMENT

Figure 1:
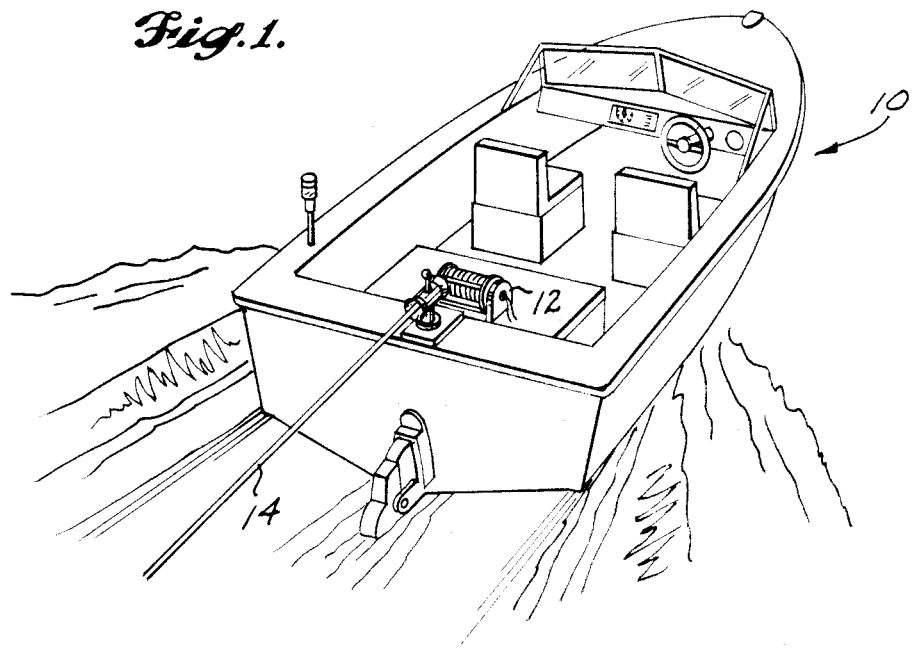
FIG. 1 is an isometric view of a boat having a winch mounted thereon that utilizes one embodiment of a rotative electrical connector made in accordance with the principles of the present invention.

FIG. 1 shows a boat 10 having a winch 12 mounted thereon. The winch 12 is used to wind and unwind a rope 14 that trails behind the boat. As is disclosed in my copending U.S. patent application Ser. No. 719,074, the boat 10 is equipped with a system for monitoring the position of a waterskier being towed by the rope 14. It is therefore necessary that the rope 14 carry information from the skier back to the boat 10. One way in which such communication between the skier and the boat can be maintained is through electrical signals, in which case it is necessary for the rope 14 to carry within it electrical leads.

Figure 2:
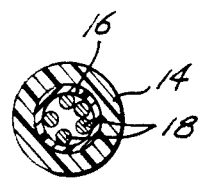
FIG. 2 is a sectional view of a rope having electrical leads placed inside its core.

FIG. 2 shows a cross section of the rope 14, which illustrates that the rope has a flexible water-resistant inner sleeve 16, which runs along its core. Inside the sleeve 16 are a number of electrical leads 18, which run the length of the rope. Since the rope must be wound on the winch 12, it is necessary for the electrical leads 18 to be connected to the reel of the winch 12 in such a manner that the reel can turn to wind and unwind the rope without disturbing the electrical connection.

Figure 3:
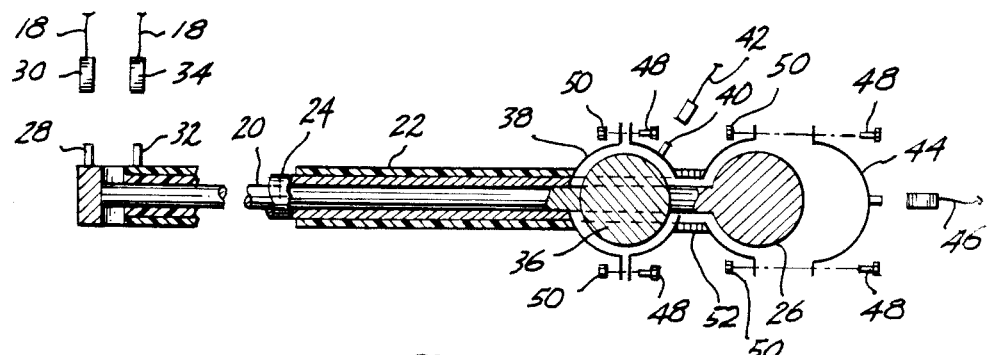
FIG. 3 is an exploded side elevational view in section of a rotative electrical connector for use in the winch of FIG. 1.

FIG. 3 shows one embodiment of a rotative electrical connector made in accordance with the principles of the present invention suitable for use in the winch 12 shown in FIG. 1. The reel of the winch is comprised of a horizontal shaft that includes two or more electrically conductive shafts 20 and 22, each concentrically located within the other and separated by an insulating spacer 24. The inner shaft 20 has a ball 26 integrally formed on one end. The ball 26 is made of a conductive material and is electrically connected to the shaft. A male electrical terminal 28 extends from the inner shaft through an opening in the outer shaft and is insulated from the outer shaft. One of the wires 18 from the rope 14 has a female connector 30 electrically affixed thereto. The female connector 30 mates with the male connector 28 to provide a continuous circuit from the wire 18 to the inner shaft 20 and, therefore, to the ball 26 at the end of the inner shaft. Similarly, a male electrical connector 32 extends from the outer shaft 22 and is mated with a female connector 34 connected to another of the wires 18 from the rope 14 to provide an electrical connection between the wire 18 and the outer shaft 22. The outer shaft 22 has a spherical member 36 integrally formed with it and in electrical communication with it. A hole is formed through the center of the spherical member 36 through which the inner shaft 20 passes. The inner shaft 20 is insulated from the spherical member 36 by the insulating spacer 24.

The spherical member 36 at the end of the outer shaft 22 is contained within an outer spherical assembly 38. The space between the spherical member 36 and the outer spherical assembly 38 is filled with a conductive lubricant that lubricates the outer spherical assembly 38, which acts as a bearing member for the spherical member 36. The conductive lubricant also conducts electricity from the spherical member 36 to the outer spherical assembly and to a connector 40 that passes through the wall of the outer spherical assembly 38 and that is in electrical communication with the assembly 38. The connector 40 also serves as a grease port for future lubrication. A wire 42 is connected to the electrical connector 40. Similarly, the ball 26 at the end of the inner shaft 20 is contained within a spherical outer bearing member 44 made of a conductive material and filled with a conductive lubricant so that the spherical bearing member 44 is in electrical contact with the wire 18 and connected to the inner shaft section 20. An electrical connection is made between a wire 46 and the spherical bearing member 44.

Preferably, both the outer spherical assembly 38 and the spherical bearing member 44 are of two-piece construction held together by bolts 48 and nuts 50 that permit their separation and repair and reassembly. A nonconductive spacer member 52 separates the outer spherical assembly 38 from the spherical bearing member 44 to prevent a short between the two wires.

The rotative electrical connection described permits 360-degree rotation of the shafts 20 and 22 and rotation thereby of the ball 26 and spherical member 36 attached to the shafts 20 and 22. As the shafts and the spherical members rotate, a continuous electrical connection is maintained between each of the wires 18 and their associated wire 42 or 46. With the spherical assembly section of the connector in a fixed position on the frame of the winch 12, it is possible to rotate the shaft of the winch 12 to wind and unwind the rope 14 containing wires 18, while maintaining a continuous electrical connection between the tow handle held by the skier at the end of the rope 14 and the electrical circuits onboard the boat 10. Similarly, in other environments, it would be possible to maintain the shafts 20 and 22 and their respective spherical members fixed while having the outer spherical assembly 38 and spherical bearing member 44 mounted on a rotating member, which would again maintain electrical connection during rotation of that member.

Figure 4:
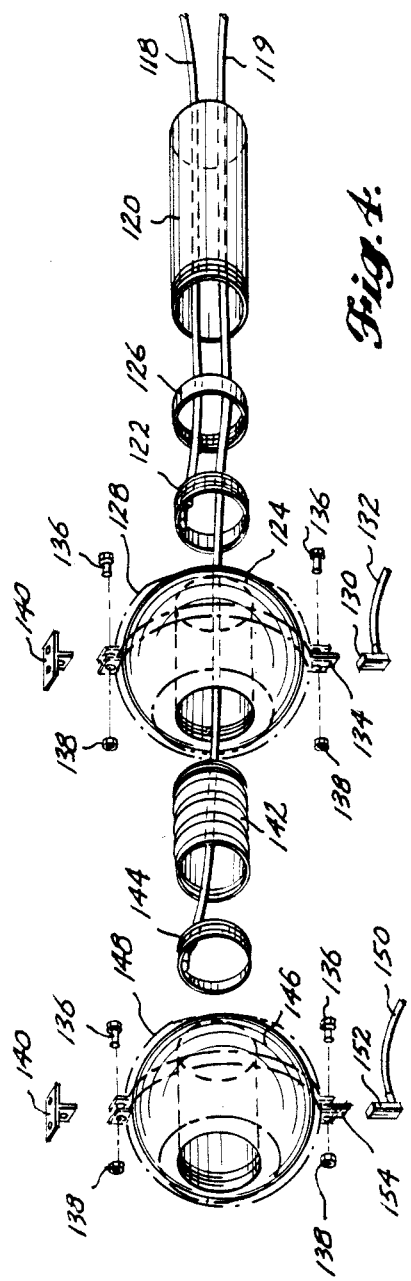
FIG. 4 is an exploded isometric view of another embodiment of the rotative electrical connector of the present invention.

FIG. 4 shows another embodiment of a spherical rotative electrical connector made in accordance with the principles of the present invention. A pair of electrical leads 118 and 119 pass through a short section of conduit 120. Wire 118 is electrically connected to a threaded conductive insert 122, which, in turn, threadably engages a spherical conductive member 124. The engagement of the ring 122 with the spherical member 124 results in an electrical connection between the wire 118 and the spherical member 124. The conduit 120 is likewise attached to a collar 126, which, in turn, is attached to the ring 122 so that the conduit 120 is eventually affixed to the spherical member 124; whether the connection through the ring 126 is insulated or conductive, depends on the environment in which the connector is to be used. While a threaded inset 122 is illustrated, it should be understood that other mechanical connective means can be used. Spherical member 124 is held in an outer spherical bearing assembly 128 and, as in the earlier embodiment, a conductive grease is used to lubricate the bearing surface between the member 124 and the outer member 128 so that there is an electrical connection between the two members. A female electrical connector 130 attached to an electrical lead 132 engages a male connector 134 formed on the outer surface of the outer bearing assembly 128. The total structural arrangement produces an electrical connection between the wire 118 and the electrical lead 132 by means of the spherical connector. It can be seen that the outer assembly can then be rotated universally about the spherical member 124 while maintaining the electrical connection. Preferably, the outer spherical member 128 is comprised of two separate sections that are held together by bolts 136, which are threadably engaged with nuts 138. A hanger 140 is shown, which can be interposed between the halves of the outer spherical member 128 and held by the nut and bolt pair 136 and 138 to allow the spherical connector to be attached to some other structure, as the need may be.

In the embodiment of the connector shown in FIG. 4, the second wire 119 passes through the same conduit 120 and then passes through a hole formed in the spherical member 124 and then through a flexible conduit section 142, which is attached to a conductive ring 144. The wire 119 is electrically connected to a second spherical member 146, which is journalled in a second outer spherical bearing assembly 148. Again, a conductive grease is used to lubricate the bearing surfaces between the spherical member 146 and the outer spherical bearing assembly 148 to provide electrical connection between the two members. A second electrical lead 150 has a female connector 152 electrically attached to it, which engages a male connector 154 formed on the exterior of the second outer spherical bearing assembly 148. An electrical connection is thus provided between the wire 119 and the second electrical lead 150 through the spherical connector. Again, the second outer spherical bearing assembly is preferably constructed in two pieces that are held together by bolt and nut pairs 136 and 138, respectively, passing through flanges formed in the outer spherical bearing assembly. Similar hanger 140 is shown interposed between the halves of the outer spherical bearing assembly and held by the bolt and nut pair 136, 138. In this manner, two separate movable electrical connections are provided from two separate wires to two individual leads. It can be seen that additional wire connections could be provided by placing additional spherical members in line with those shown as an add-on to the left as viewed in FIG. 4.

Figure 5:
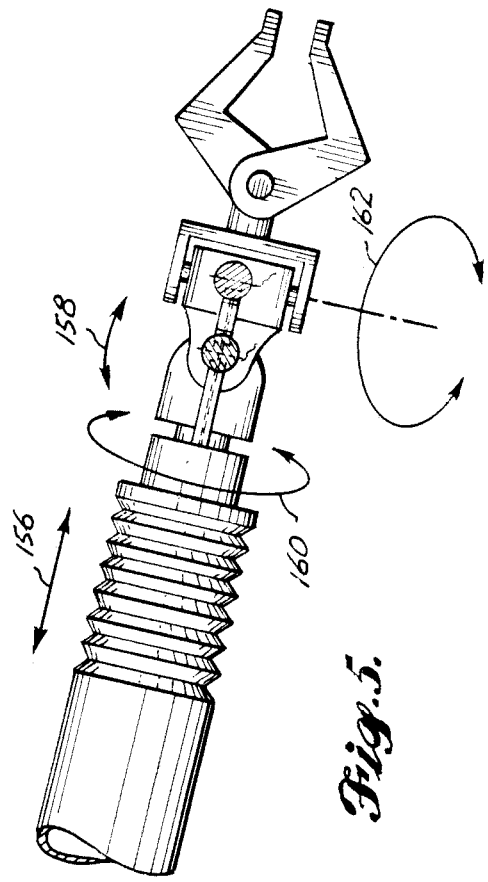
FIG. 5 is a side elevational view of a robotic arm with the rotative electrical connector of FIG. 4 installed therein.

FIG. 5 shows a typical robotic arm and demonstrates the application of a spherical connector such as that shown in FIG. 4. It can be 160, and 162 and still maintain electrical connection as desired through the spherical connectors described in FIG. 4. It is also possible to use the conduit 120 to hold other cables, such as fiber-optic or tendon cables, which could run the length of the connector and past the last spherical member to the hand of the robot, if desired.

In summary, therefore, a spherical rotative electrical connector has been described and illustrated that allows the electrical connection of a wire to a movable member so that the member can be moved while maintaining continuous electrical conductivity. By using a spherical connector, almost universal movement of the member can be accomplished without fatiguing the electrical lead or breaking the electrical circuit. While the connectors shown and described have been utilized to connect two wires, it is to be understood by those of ordinary skill in the art and others that the spherical connectors shown can be stacked in numbers greater than two for the connection of a greater number of electrical leads. It is also true that some changes can be made to the illustrated and described embodiments while remaining within the spirit and scope of the invention and therefore the described and illustrated embodiments are to be exemplary only and the invention is intended to encompass the equivalents of the illustrated and described embodiments. Since changes can be made while remaining within the scope of the invention, the invention should be described solely with reference to the claims that follow.

The embodiments of the invention in which an exclusive property or privilege is claimed are defined as follows:

1. A rotative electrical connector for electrically connecting a plurality of wires including:
    a first inner spherical conductive member electrically connected to a first wire;
    an outer spherical shell substantially encompassing said spherical member, said shell electrically connected to a second wire;
    means for electrically connecting said spherical member to said spherical shell;
    a first conductive rod affixed to said spherical member, said first wire being connected to said first conductive rod;
    a second conductive rod surrounding said first conductive rod, said second conductive rod being insulated from said first conductive rod;
    a second inner spherical conductive member affixed to a first end of said second conductive rod, said second inner spherical conductive member having a bore formed therethrough through which said first conductive rod passes, said first conductive rod being insulated from said second inner spherical conductive member;
    means for attaching a third wire to said second conductive rod;
    an outer spherical bearing assembly substantially surrounding said second inner spherical conductive member, said second inner spherical conductive member being rotatable within said outer spherical bearing assembly;
    means for electrically connecting said second inner spherical conductive member with said outer spherical bearing assembly; and
    means for connecting a fourth wire to said spherical outer bearing assembly so that an electrical connection is maintained between said third wire and said fourth wire.

2. The electrical connector of claim 1, wherein an inner surface of said outer spherical shell is conductive and said means for electrical connection is conductive grease that fills the area between said spherical member and said spherical shell.

3. The electrical connector of claim 1, wherein an inner surface of said spherical shell is conductive and is in contact with said spherical member.

4. The electrical connector of claim 1, wherein said means for electrically connecting said second inner spherical conductive member and said spherical outer bearing assembly comprises a conductive lubricant in the space between the second inner spherical conductive member and the spherical outer being assembly.

5. The electrical connector of claim 4, further including an insulating member interposed between said outer spherical shell and said spherical outer bearing assembly to maintain a predetermined spacing between said outer spherical shell and said outer spherical bearing assembly.

6. A rotative electrical connector for connecting a first wire to a second wire and a third wire to a fourth wire comprising:
    a first conductive spherical member;
    means for attaching said first wire to said first spherical member;
    a first spherical shell substantially encompassing said first spherical member;
    means for attaching said first spherical shell to said second wire;
    a second conductive spherical member;
    means for connecting said third wire to said second spherical member;
    a second spherical shell substantially encompassing said second spherical member;
    means for connecting said fourth wire to said second spherical shell;
    insulating means attached to said first and second spherical members for mechanically connecting said first and second spherical members, said insulating means being a flexible conduit; and
    means for electrically connecting said first spherical member to said first spherical shell and said second spherical member to said second spherical shell.

7. The connector of claim 6, wherein said first and second spherical shells are comprised of first and second halves removably affixed to one another.

8. The electrical connector of claim 6, wherein said means for connecting said spherical member to its respective spherical shell is a conductive lubricant placed between said spherical member and the interior of said surface of said spherical shell.

9. The electrical connector of claim 6, wherein said first conductive spherical member has a bore formed therethrough in register with a first end of said flexible conduit.

10. The connector of claim 9, wherein said second conductive spherical member has a bore formed therethrough in register with a second end of said flexible conduit.

* * * * *

UNITED STATES PATENT AND TRADEMARK OFFICE
CERTIFICATE OF CORRECTION

PATENT NO. : 4,746,297

DATED : May 24, 1988

INVENTOR(S) : James R. Soleau

It is certified that error appears in the above-identified patent and that said Letters Patent is hereby corrected as shown below:

Column 1, line 22: "expensive" should be --extensive--
Column 2, line 24: "waterskier" should be --water-skier--
Column 3, line 64: "inset" should be --insert--
Column 4, line 52: add --seen that the robotic arm can move in the manner shown by the arrows 156, 158,-- after "be"
Column 6, line 11: "being" should be --bearing--

Signed and Sealed this

Fourteenth Day of February, 1989

Attest:

DONALD J. QUIGG

*Attesting Officer*   *Commissioner of Patents and Trademarks*